US010202912B2

United States Patent
Glugla et al.

(10) Patent No.: US 10,202,912 B2
(45) Date of Patent: Feb. 12, 2019

(54) SYSTEM AND METHOD FOR REDUCING VARIABLE COMPRESSION RATIO ENGINE SHUTDOWN SHAKE

(71) Applicant: Ford Global Technologies, LLC, Dearborn, MI (US)

(72) Inventors: Christopher Paul Glugla, Macomb, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/628,247

(22) Filed: Jun. 20, 2017

(65) Prior Publication Data

US 2018/0363572 A1  Dec. 20, 2018

(51) Int. Cl.
*F02B 75/04* (2006.01)
*F02D 15/02* (2006.01)
*F02D 35/02* (2006.01)
*B60K 6/48* (2007.10)

(52) U.S. Cl.
CPC .......... *F02D 35/027* (2013.01); *F02B 75/045* (2013.01); *F02D 15/02* (2013.01); *B60K 2006/4841* (2013.01)

(58) Field of Classification Search
CPC ...... F02B 35/027; F02D 15/02; F02D 41/042; F02D 2041/0095; F02B 75/045; B60K 2006/4841
USPC ... 123/198 DB, 198 DC, 48 B, 78 B, 78 BA; 701/112
See application file for complete search history.

(56) References Cited

U.S. PATENT DOCUMENTS

| | | |
|---|---|---|
| 6,318,308 B1 | 11/2001 | Hsu et al. |
| 6,349,698 B2 | 2/2002 | Park |
| 6,553,949 B1 | 4/2003 | Kolmanovsky et al. |
| 6,564,769 B2 | 5/2003 | Kolmanovsky et al. |
| 6,915,766 B2 | 7/2005 | Aoyama et al. |
| 7,131,425 B2 | 11/2006 | Ramappan et al. |
| 7,191,755 B2 | 3/2007 | Vint |
| 7,222,607 B2 | 5/2007 | Hernandez |
| 8,087,390 B2 | 1/2012 | Hiyoshi et al. |
| 8,495,984 B2 | 7/2013 | Riegel et al. |
| 9,039,571 B2 | 5/2015 | Doering et al. |

(Continued)

FOREIGN PATENT DOCUMENTS

| | | |
|---|---|---|
| EP | 0848155 A2 | 6/1998 |
| EP | 1724457 A1 | 11/2006 |

(Continued)

OTHER PUBLICATIONS

Glugla, C., "Method and System for Engine Control," U.S. Appl. No. 15/467,957, filed Mar. 23, 2017, 50 pages.

*Primary Examiner* — Hai Huynh
(74) *Attorney, Agent, or Firm* — Julia Voutyras; McCoy Russell LLP

(57) ABSTRACT

Methods and systems are provided for adjusting a compression ratio of a variable compression ratio (VCR) engine during engine shutdown. In one example, a method (or system) may include actuating a VCR mechanism from a higher compression ratio setting to a lower compression ratio setting after a last combustion event and before the engine spins down to rest. In this way, engine shake, for example, due to piston bounce-back, may be reduced.

17 Claims, 3 Drawing Sheets

(56) References Cited

U.S. PATENT DOCUMENTS

| | | | |
|---|---|---|---|
| 2003/0111067 A1* | 6/2003 | Russell | ................... F02D 15/02 |
| | | | 123/685 |
| 2011/0139118 A1 | 6/2011 | Glugla et al. | |
| 2012/0271533 A1 | 10/2012 | Shishime | |
| 2014/0060503 A1 | 3/2014 | Zhu et al. | |
| 2016/0312725 A1 | 10/2016 | Edington et al. | |

FOREIGN PATENT DOCUMENTS

| | | | | |
|---|---|---|---|---|
| JP | 2011153597 | * | 8/2011 | ............. F02D 13/02 |
| WO | 2014057534 A1 | | 4/2014 | |

* cited by examiner

SYSTEM AND METHOD FOR REDUCING VARIABLE COMPRESSION RATIO ENGINE SHUTDOWN SHAKE

FIELD

The present description relates generally to methods and systems for controlling a variable compression ratio engine.

BACKGROUND/SUMMARY

A compression ratio of an internal combustion engine is defined as a ratio of a cylinder volume when a piston within the cylinder is at bottom-dead-center (BDC) to the cylinder volume when the piston is at top-dead-center (TDC). In general, the higher the compression ratio, the higher the thermal efficiency of the internal combustion engine. This in turn results in improved fuel economy and a higher ratio of output energy versus input energy of the engine. In conventional engines, the compression ratio is fixed. However, in variable compression ratio (VCR) engines, the engine may be equipped with various mechanisms to alter (e.g., mechanically) the volumetric ratio between the piston TDC and BDC, allowing the compression ratio to be varied as engine operating conditions change. As a non-limiting example, the VCR engine may be configured with a mechanical piston displacement changing mechanism (e.g., an eccentric) that moves the piston closer to or further from the cylinder head, thereby changing the size of the combustion chambers. Still other engines may mechanically alter a cylinder head volume.

One example approach for leveraging the benefits of a VCR mechanism is shown by Kolmanovsky et al in U.S. Pat. No. 6,553,949. Therein, a higher compression ratio may be used in low engine speed-load regions to increase thermal efficiency. A lower compression ratio may be used in higher engine speed-load regions. Further, knock may be mitigated in the low speed-load region using spark retard, while knock is mitigated in the higher speed-load region via adjustments to the compression ratio. When the engine becomes spark limited while operating in the higher compression ratio, the combustion phasing retard may erode the thermal efficiency benefit of the compression ratio. At that time, the compression ratio may be lowered while spark timing is advanced so as to provide a more efficient balance between combustion phasing and thermal efficiency.

However, the inventors herein have recognized potential issues with such systems. As one example, if an engine shutdown is initiated while the engine is operating at a higher compression ratio, there may be significant engine shake and vibrations due to increased piston bounce-back from the higher pressure in the higher compression ratio cylinder. The increased vibrations may disturb vehicle occupants and cause objectionable noise. The issue may be exacerbated in certain engine speed regions traversed during an engine shutdown when operating in the higher compression ratio.

In one example, the issues described above may be addressed by a method, comprising: operating an engine at a compression ratio via mechanical adjustments to a variable compression ratio mechanism, the compression ratio selected based on operating conditions; and during an engine shutdown, lowering the compression ratio after a last combustion event and before disabling fuel and spark. In this way, engine shake during shutdown may be reduced, minimizing disturbances to vehicle occupants.

As one example, the compression ratio is lowered during engine shutdown responsive to predicted or detected engine shake during the engine shutdown, the engine shake predicted based on engine speed when the engine shutdown is initiated and detected based on output from a vibration sensor coupled to an engine block. In other examples, such as when engine shake is not predicted, the compression ratio may be maintained during engine shutdown, such as when the shutdown is initiated by an engine controller responsive to idle-stop conditions being met. Engine shake may be predicted based on the engine speed being above a threshold engine speed and/or the compression ratio being above a threshold compression ratio, for example. By reducing the compression ratio when engine shake is predicted, piston bounce-back may be decreased during engine shutdown, thereby reducing engine shake and vibrations and the resulting disturbance to vehicle occupants. Further, by maintaining the compression ratio when engine shake is not predicted, engine efficiency may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
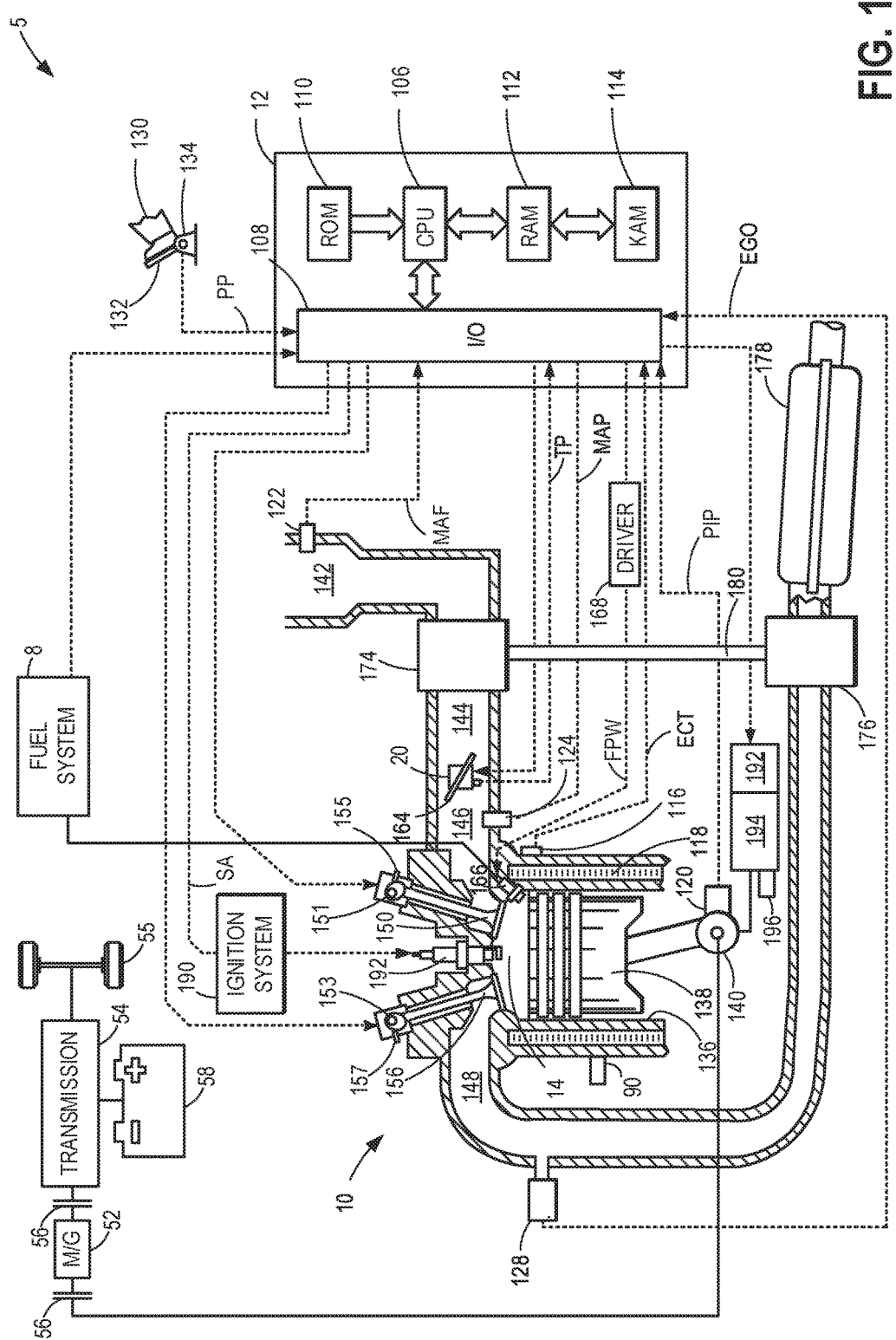
FIG. 1 illustrates an example engine system configured with a variable compression ratio (VCR) mechanism.

The following description relates to systems and methods for reducing shutdown shake in an engine system equipped with a variable compression ratio (VCR) mechanism, such as the example engine system of FIG. 1. By actuating the VCR mechanism, a position of a piston within a cylinder of the engine, and therefore a compression ratio of the engine, can be varied, allowing for improvements in thermal efficiency. A controller may be configured to perform a control routine, such as the example routine of FIG. 2, to reduce the compression ratio of the engine during engine shutdown to reduce an amount of shake produced while the engine is rotating, unfueled, to rest. An example engine operation with compression ratio adjustments is shown in FIG. 3. In this way, engine efficiency may be maximized during engine operation while noise, vibration, and harshness (NVH) may be reduced during engine shutdown.

FIG. 1 depicts an example embodiment of a combustion chamber (herein, also referred to as "cylinder") 14 of an internal combustion engine 10, which may be included in a passenger vehicle 5. Engine 10 may receive control parameters from a control system, including a controller 12, and input from a vehicle operator 130 via an input device 132. In this example, input device 132 includes an accelerator pedal and a pedal position sensor 134 for generating a proportional pedal position signal PP. Cylinder 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of the passenger vehicle via a transmission system 54. Further, a starter motor may be coupled to crankshaft 140 via a flywheel to enable a starting operation of engine 10.

Engine 10 may be configured as a VCR engine wherein the compression ratio (CR) of each cylinder—a ratio of a cylinder volume when the piston is at bottom-dead-center (BDC) to a cylinder volume when the piston is at top-dead-center (TDC)—can be mechanically altered. The CR of the engine may be varied via a VCR actuator 192 actuating a VCR mechanism 194. In some example embodiments, the CR may be varied between a first, lower CR (wherein the ratio of the cylinder volume when the piston is at BDC to the cylinder volume when the piston is at TDC is smaller) and a second, higher CR (wherein the ratio is higher). In still other example embodiments, there may be predefined number of stepped compression ratios between the first, lower CR and the second, higher CR. Further still, the CR may be continuously variable between the first, lower CR and the second, higher CR (to any CR in between).

In the depicted example, VCR mechanism 194 is coupled to piston 138 such that the VCR mechanism may change the piston TDC position. For example, piston 138 may be coupled to crankshaft 140 via VCR mechanism 194, which may be a piston position changing mechanism that moves the piston closer to or further from the cylinder head, thus changing the position of the piston and thereby the size of combustion chamber 14. A position sensor 196 may be coupled to the VCR mechanism 194 and may be configured to provide feedback to controller 12 regarding the position of VCR mechanism 194 (and thereby the CR of the cylinder).

In one example, changing the position of the piston within the combustion chamber also changes the relative displacement of the piston within the cylinder. The piston position changing VCR mechanism may be coupled to a conventional cranktrain or an unconventional cranktrain. Non-limiting examples of an unconventional cranktrain to which the VCR mechanism may be coupled include variable distance head crankshafts and variable kinematic length crankshafts. In one example, crankshaft 140 may be configured as an eccentric shaft. In another example, an eccentric may be coupled to, or in the area of, a piston pin, with the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). In another example, the VCR mechanism may include a hydraulic pressure-reactive, air pressure-reactive, or mechanically reactive piston. Further still, the VCR mechanism may include a multi-link mechanism, a bent rod mechanism, or other VCR mechanizations.

It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (e.g., a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to VCR actuator 192 to actuate VCR mechanism 194 to a first position where the piston has a smaller effective displacement within the combustion chamber. As another example, the engine may be operated at a second, higher compression ratio by the controller sending a signal to VCR actuator 192 to actuate VCR mechanism 194 to a second position where the piston has a larger effective displacement within the combustion chamber. Changes in the engine compression ratio may be advantageously used to improve fuel economy. For example, the higher compression ratio may be used to improve fuel economy at light to moderate engine loads until spark retard from early knock onset erodes the fuel economy benefit. The engine can then be switched to the lower compression ratio, thereby trading off thermal efficiency for combustion phasing efficiency. In comparison, the lower compression ratio may be selected to improve performance at mid-high engine loads. Continuous VCR systems may continuously optimize the combustion phasing and the thermal efficiency to provide the best compression ratio between the higher compression ratio and lower compression ratio limits at the given operating conditions.

Returning to FIG. 1, cylinder 14 may receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. As shown, compressor 174 may be at least partially powered by exhaust turbine 176 via a shaft 180. However, in other examples, such as where engine 10 is configured with a supercharger, exhaust turbine 176 may be optionally omitted, and compressor 174 may instead be powered by mechanical input from a motor of the engine.

A throttle 20, including a throttle plate 164, may be provided between intake air passage 144 and intake air passage 146 for varying the flow rate and/or pressure of intake air provided to the engine cylinders. For example, throttle 20 may be disposed downstream of compressor 174, as shown in FIG. 1, or may alternatively be provided upstream of compressor 174.

Exhaust passage 148 may receive exhaust gases from other cylinders of engine 10 in addition to cylinder 14. An exhaust gas sensor 128 is shown coupled to exhaust passage 148 upstream of an emission control device 178. Exhaust gas sensor 128 may be any suitable sensor for providing an indication of exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as engine speed, engine load, AFR, spark timing, etc. Further, exhaust temperature may be determined from one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including one intake poppet valve 150 and one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via a cam actuation system 151. Similarly, exhaust valve 156 may be controlled by controller 12 via a cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation, including CPS and/or VCT systems. In still other embodiments, the intake and exhaust valves may be controlled by a common valve actuator or actuation system or a variable valve timing actuator or actuation system.

Cylinder 14 may have an associated compression ratio, which, as described above, is the ratio of volumes when piston 138 is at BDC to TDC. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be varied based on driver demand via adjustments to the VCR actuator 192 that actuates the VCR mechanism 194, varying the effective position of piston 138 within combustion chamber 14. The compression ratio may be inferred based on feedback from sensor 196 regarding the position of the VCR mechanism 194.

In some embodiments, each cylinder of engine 10 may include a spark plug 192 for initiating combustion. An ignition system 190 may provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection ("DI") of fuel into combustion cylinder 14. While FIG. 1 shows injector 166 as a side injector, injector 166 may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8, which may include one or more fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the one or more fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector, in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections fuel may be performed per cycle. The multiple injections may be performed during the compression stroke, intake stroke, or any appropriate combination thereof in what is known as split injection. Also, fuel may be injected during the cycle to adjust the air-fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of oxygen in the exhaust gas, which is higher for lean mixtures and lower for rich mixtures, the sensor may determine the AFR. As such, the AFR may be provided as a lambda ($\lambda$) value, which is a ratio of the determined AFR to a stoichiometric AFR (e.g., the AFR for a complete combustion reaction to occur) for a given mixture. Thus, a $\lambda$ value of 1.0 indicates a stoichiometric mixture, while a $\lambda$ value less than 1.0 indicates richer than stoichiometry mixtures and a $\lambda$ value greater than 1.0 indicates leaner than stoichiometry mixtures.

As described above, FIG. 1 shows only one cylinder of a multi-cylinder engine. As such each cylinder may similarly include its own set of intake/exhaust valves, fuel injector(s), spark plug(s), etc.

Fuel tanks in fuel system 8 may hold fuel with different fuel qualities, such as different fuel compositions. These differences may include different alcohol content, different octane, different heats of vaporization, different fuel blends, and/or combinations thereof, etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. In another example, knock sensor 90 may provide an indication of engine shake (e.g., vibrations), which may occur during engine shutdown, particularly at high compression ratios. For example, piston bounce-back as the engine spins to rest may be higher at higher compression ratios due to the higher compressing force, causing vibrations that are picked up by the knock sensor. Alternatively, the shutdown shake may be detected by a vibration sensor coupled to the engine block.

Returning to FIG. 1, controller 12 is shown as a microcomputer, including a microprocessor unit 106, input/output ports 108, an electronic storage medium for executable programs and calibration values shown as read-only memory chip 110 in this particular example, a random access memory 112, a keep alive memory 114, and a data bus. Controller 12 may receive various signals from sensors coupled to engine 10, including, in addition to those signals previously discussed, a measurement of inducted mass air flow (MAF) from a mass air flow sensor 122, engine coolant temperature (ECT) from a temperature sensor 116 coupled to a cooling sleeve 118, a profile ignition pickup signal (PIP) from a Hall effect sensor 120 (or other type) coupled to crankshaft 140, throttle position (TP) from a throttle position sensor, an absolute manifold pressure signal (MAP) from a MAP sensor 124, cylinder AFR from EGO sensor 128, abnormal combustion from knock sensor 90 and a crankshaft acceleration sensor, and VCR mechanism position from position sensor 196. Engine speed signal, RPM, may be generated by controller 12 from signal PIP. The signal MAP from MAP sensor 124 may be used to provide an indication of vacuum or pressure in the intake manifold. Controller 12 receives signals from the various sensors of FIG. 1 and employs the various actuators of FIG. 1 to adjust engine operation based on the received signals and instructions stored on a memory of the controller. For example, based on the engine speed and load, the controller may adjust the compression ratio of the engine by sending a signal to the VCR actuator 192, which actuates the VCR mechanism 194 to mechanically move the piston closer to or further from the cylinder head, thereby changing a volume of the combustion chamber.

Non-transitory storage medium read-only memory 110 can be programmed with computer readable data representing instructions executable by microprocessor unit 106 for performing the methods described below as well as other variants that are anticipated but not specifically listed.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

In this way, the components of FIG. 1 provide for a system comprising: an engine; a variable compression ratio mechanism for mechanically altering a piston displacement within a cylinder; a vibration sensor coupled to the engine; a pedal for receiving an operator input; and a controller with computer readable instructions for: actuating the variable compression ratio mechanism to a first position corresponding to a higher compression ratio responsive to a lower than threshold engine load; and responsive to an operator requested engine shutdown, disabling fuel delivery to the engine; and after completing a last combustion event while in the higher compression ratio, actuating the variable compression ratio mechanism to a second position corresponding to a lower compression ratio. In an example, the engine is spun to rest while in the lower compression ratio and maintained in the lower compression ratio until a subsequent engine restart command is received, and the controller may include further instructions for: responsive to an engine restart command, cranking the engine with the variable compression ratio mechanism in the second position, and after engine speed is above a threshold speed, actuating the variable compression ratio mechanism to the first position corresponding to the higher compression ratio. In some examples, the controller may include further instructions for: responsive to an automatic engine shutdown without operator input, disabling fuel delivery to the engine, maintaining the variable compression ratio mechanism in the first position, and spinning the engine to rest while in the higher compression ratio. Additionally or optionally, the controller may include further instructions for: responsive to an output of the vibration sensor being higher than a threshold while spinning the engine to rest while in the higher compression ratio, actuating the variable compression ratio mechanism to the second position corresponding to the lower compression ratio. In another example, actuating the variable compression ratio mechanism to the second position corresponding to the lower compression ratio is responsive to an engine speed when the operator requested shutdown is received being higher than a threshold speed, and wherein the controller includes further instructions for: responsive to an engine speed when the operator requested shutdown is received being lower than the threshold speed, transitioning from the higher compression ratio to the lower compression ratio after completing the last combustion event, then disabling fuel delivery to the engine and spinning the engine to rest in the lower compression ratio.

Figure 2:
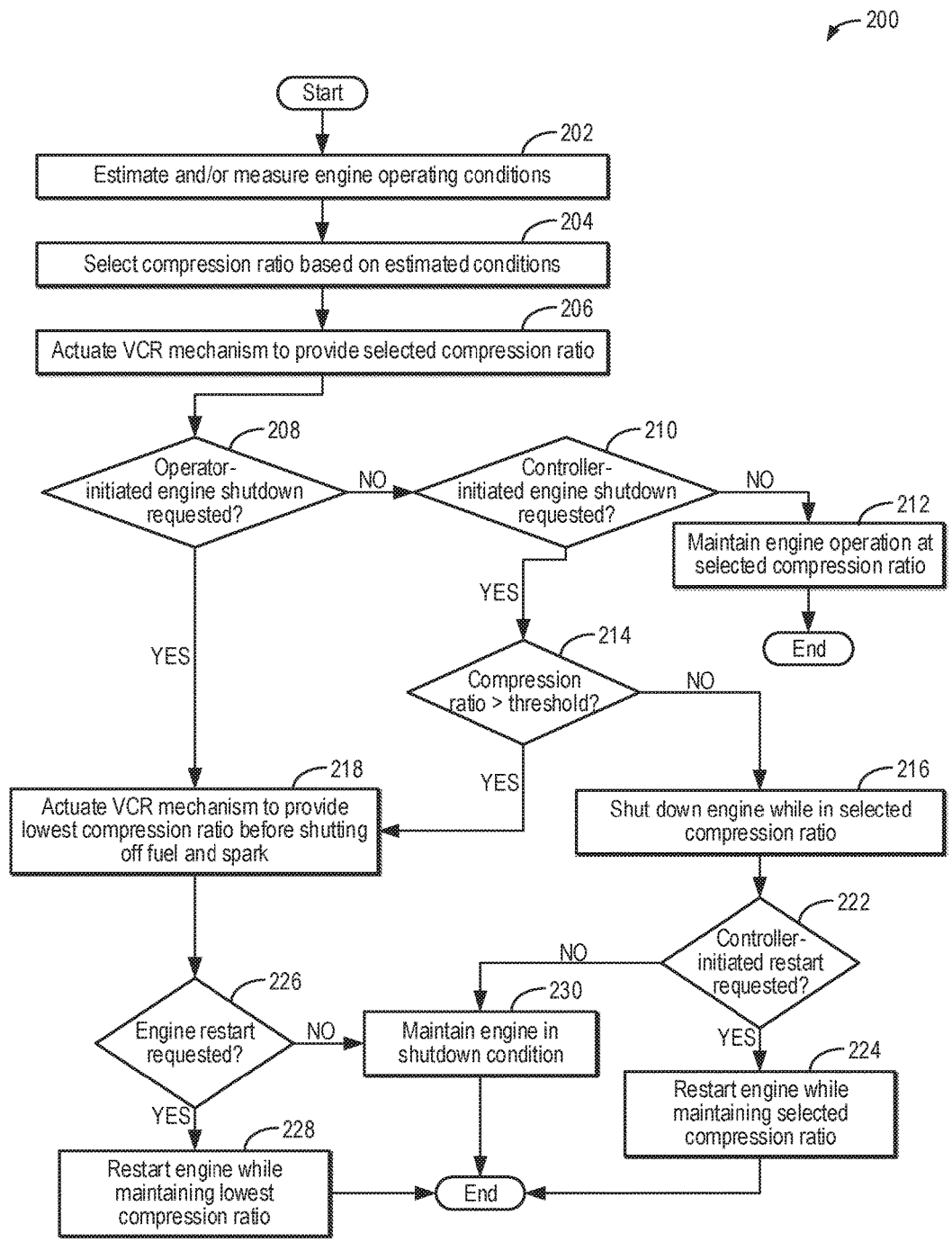
FIG. 2 shows a high-level flow chart of an example method for positioning a VCR mechanism to reduce engine shutdown shake.
Figure 3:
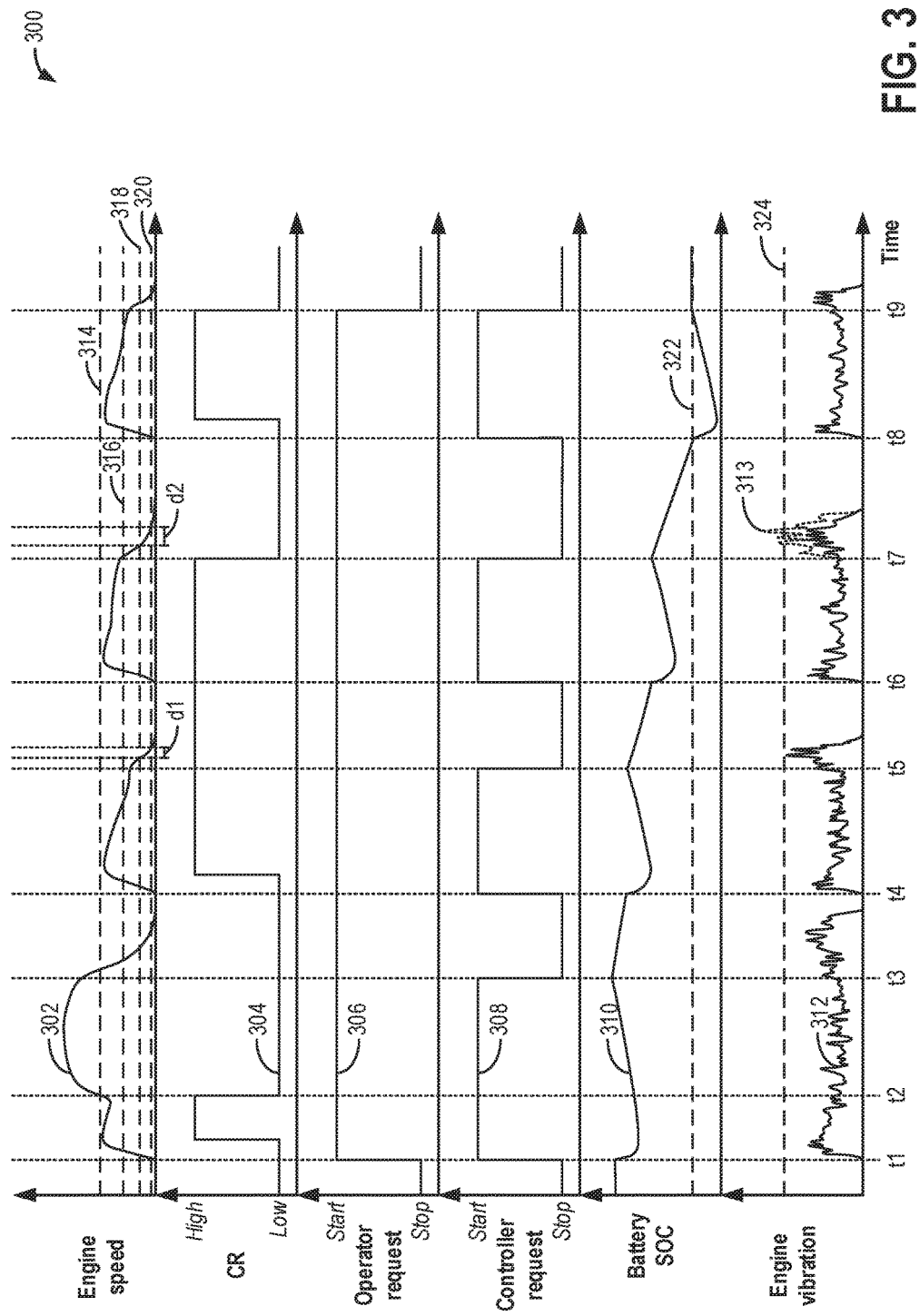
FIG. 3 depicts a prophetic example of adjusting a compression ratio of an engine via a VCR mechanism during engine shutdown and restart operations.

Now turning to FIG. 2, an example method 200 for adjusting a compression ratio of a VCR engine (such as engine 10 of FIG. 1) based on engine operating conditions and further adjusting the compression ratio based on an engine shutdown request is shown. For example, if the engine is operating at a high compression ratio when engine shutdown is requested, the compression ratio may be reduced to reduce engine shutdown shake. Further, adjusting the compression ratio during engine shutdown may differ depending on whether the shutdown request is operator-initiated or controller-initiated, such as during an idle-stop, as described further below. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system (e.g., VCR actuator 192 of FIG. 1) to adjust engine operation according to the methods described below.

Method 200 begins at 202 and includes estimating and/or measuring engine operating conditions. Engine operating conditions may include, for example, driver power demand (for example, as based on an output of a pedal position sensor coupled to an accelerator pedal); ambient temperature, pressure, and humidity; engine temperature; manifold pressure (MAP); manifold air flow (MAF); catalyst temperature; intake temperature; boost level; fuel octane of fuel available in a fuel tank; battery state of charge; etc.

At 204, method 200 includes selecting a compression ratio for operating the engine based on the estimated engine operating conditions. The engine may be configured with a VCR mechanism (e.g., VCR mechanism 194 of FIG. 1) that mechanically alters the engine compression ratio between a first, higher and a second, lower compression ratio setting. The VCR mechanism may achieve this by mechanically altering a position of a piston within a cylinder responsive to a command received from the engine controller. Thus, operating the engine at the first, higher compression ratio may include operating the engine in a first mode, and operating the engine at the second, lower compression ratio may include operating the engine in a second mode. Alternatively, multiple compression ratios between the first and second compression ratio may be possible. The controller may compare the fuel efficiency at each compression ratio of the engine at the given driver power demand and select the compression ratio that provides the highest fuel efficiency. The controller may compare the fuel efficiency at each compression ratio by comparing the brake specific fuel consumption (BSFC) of the engine at each compression ratio, for example. The fuel efficiency of the engine at each compression ratio may be determined via a table, a map, an algorithm, and/or an equation, each stored as a function of operating conditions (e.g., engine speed, load, torque demand, temperature, humidity, inferred fuel octane, etc.).

At 206, method 200 includes actuating the VCR mechanism to provide the selected compression ratio. For example, the controller may send a signal to the VCR actuator coupled to the VCR mechanism to actuate the mechanism to a position that provides the selected compression ratio. In one example, the controller may send a signal to actuate the VCR mechanism to the first, higher compression ratio setting at low-to-moderate engine speeds and loads. As another example, the controller may send a signal to actuate the VCR mechanism to the second, lower compression ratio setting at moderate-to-high engine speeds and loads.

At 208, method 200 includes determining if an operator-initiated engine shutdown is requested. In one example, a shutdown request from the vehicle operator may be confirmed in response to a vehicle ignition being moved to a key-off position. In another example, the vehicle operator may depress a push-button to request engine shutdown.

If the operator-initiated engine shutdown is not requested, method 200 proceeds to 210 and includes determining if a controller-initiated engine shutdown is requested. The controller-initiated engine shutdown may include an engine shutdown request in response to idle-stop conditions being met and without receiving an operator request to stop the engine. Thus, at 210, it may also be confirmed if idle-stop conditions have been met. Idle-stop conditions may include, for example, the engine operating (e.g., carrying out combustion), the battery state of charge (SOC) being more than a threshold SOC (e.g., 30% SOC), a vehicle speed being within a desired range (e.g., no more than 30 mph), no request for air-conditioner operation, engine temperature (e.g., as inferred from an engine coolant temperature) being within a selected temperature range (e.g., above a threshold temperature), a throttle opening degree (e.g., as determined by a throttle position sensor) indicative of no start requested by the vehicle driver, a driver requested torque being less than a predetermined threshold torque, a brake sensor status indicating that the brake pedal has been pressed, an engine speed being below a threshold engine speed, an input shaft rotation number being below a predetermined threshold rotation number, etc. In one example, the vehicle may be at rest when the idle-stop conditions are met. In another example, the vehicle may be in motion (e.g., coasting) when the idle-stop conditions are met. Any or all of the idle-stop conditions may be met for an idle-stop condition to be confirmed.

If the controller-initiated engine shutdown is not requested (e.g., an idle-stop condition is not confirmed), method 200 proceeds to 212 and includes maintaining engine operation at the selected compression ratio. As engine operating conditions change, the compression ratio may be adjusted to provide optimal thermal efficiency and combustion phasing. For example, the compression ratio of the engine, fuel injection timings and amounts, and spark timing may be nominally adjusted based on engine operating conditions, including changing operator torque demand, to optimize fuel economy. Following 212, method 200 ends.

If the controller-initiated engine shutdown is requested, method 200 proceeds to 214 and includes determining if the compression ratio is greater than a threshold. For example, the threshold may define a compression ratio above which a greater than threshold amount of engine shake is expected to occur based on the engine speed when shutdown is initiated. The engine speed when shutdown is initiated may be further related to a predicted duration spent by the engine in a shutdown shake speed region of the engine (e.g., 350-150 RPM) during the engine spin-down to rest, the shutdown shake region encountered below an idling speed region of the engine. For example, at higher engine speeds, it may take longer (e.g., a larger duration) for the engine to spin down due to the inertia of the engine, prolonging the amount of time spent in the shutdown shake region and thereby increasing the amount of engine shake during shutdown. The actual amount of shake may be measured via vibration sensors, which may include a knock sensor (e.g., knock sensor 90 of FIG. 1). The threshold may be learned from a history of the engine based on occurrences of engine shake during shutdown at various compression ratios. In one example, the controller may correlate the engine speed (e.g., as determined based on signal PIP from Hall effect sensor 120 of FIG. 1) and the compression ratio (e.g., as determined via a VCR mechanism position sensor, such as position sensor 196 of FIG. 1) with the amount of shake to generate a look-up table, which may be continuously updated as shutdown data are generated. In another example, the look-up table may be pre-calibrated and may optionally be further adjusted based on the shake history of the engine during previous engine shutdown events. The controller may input the engine speed into the look-up table and output the threshold compression ratio above which the greater than threshold amount of engine shake is expected to occur. Alternatively, the compression ratio may be input into the look-up table, with a threshold engine speed for the input compression ratio as the output, and the compression ratio may be determined to be greater than the threshold if the engine is speed is greater than the threshold engine speed. In one example, the threshold engine speed may be based on engine oil pressure. For example, if a shutdown is commanded at higher engine speeds, there may be sufficient oil pressure available to actuate the VCR mechanism to the lower compression ratio if engine shutdown shake is predicted. However, at lower engine speeds, this may not be possible. Therefore, even if engine shutdown shake is predicted for a shutdown commanded at lower engine speeds, the controller may continue to shut down the engine in the higher (current) compression ratio.

In still other examples, the controller may determine the threshold compression ratio (and thereby determine if the actual compression ratio is greater than the threshold compression ratio) using an algorithm or equation that relates the engine speed and compression ratio with a predicted amount of engine shake.

In one example, lowering the compression ratio includes moving to the lower most possible compression ratio. However in other examples, if there is not enough time available to move to the lower most compression ratio, a compression ratio may be selected that is lower than the current ratio and where the engine shutdown shake levels are acceptable.

In an alternative example, the threshold compression ratio may be determined based on engine temperature, ambient temperature, and a knock history of a cylinder. For example, if the engine and/or the ambient temperature are hot, restarting the engine at a high compression ratio may produce knock, whereas the risk of knock is minimal under cold conditions, even at the high compression ratio. The threshold compression ratio may be set on a cylinder-by-cylinder basis using the knock history of each cylinder. For example, a cylinder with a high propensity for knock may have a lower threshold compression ratio than a cylinder with a low propensity for knock. The controller may refer a look-up table with the engine temperature, the ambient temperature, and knock history as the input and output the threshold compression ratio for each cylinder, for example.

If the compression ratio is not greater than the threshold, method 200 proceeds to 216 and includes shutting down the engine while in the selected compression ratio (e.g., as selected at 204). Thereby, the engine may be restarted while in the selected compression ratio during the subsequent restart. Shutting down the engine may include shutting off fuel and/or spark to the engine and allowing it to spin down to rest (e.g., zero RPM). In one example, the engine may be shut down in the higher compression ratio and then restarted in the higher compression ratio. By maintaining the higher compression ratio when engine shutdown shake is not expected, the subsequent restart may be quicker, and the engine may be able to produce torque more quickly. For example, fuel evaporation may be more efficient at the higher compression ratio, particularly in a cold engine. Further, VCR mechanism wear may be reduced, thereby extending the life of engine components. Further still, maintaining the VCR position may be favorable when the battery SOC is low and actuating the VCR actuator would consume energy.

At 222, it is determined if a controller-initiated engine restart is requested. For example, the controller-initiated engine restart request may follow a controller-initiated engine shutdown; however, it should be understood that the controller-initiated restart may also include input from the vehicle operator, such as via accelerator pedal depression, as described further below. It may be determined that a controller-initiated engine restart is requested if restart conditions are met. Restart conditions may include driver-requested torque being above a threshold torque, air conditioning being requested, battery SOC being below a threshold SOC (for example, below 30%), emission control device temperature being below a threshold temperature, vehicle speed being above a threshold speed, a pedal position sensor indicating the accelerator pedal being engaged (e.g., a tip-in event), a brake pedal being released, an electrical load of the engine being above a threshold electrical load, etc. Any or all of the restart conditions may be met for the controller-initiated engine restart request to be confirmed.

If the controller-initiated engine restart is requested, method 200 proceeds to 224 and includes restarting the engine while maintaining the selected compression ratio. Thus, the position of the VCR mechanism is not adjusted during engine shutdown, as the higher than threshold amount of engine shake is not expected. In addition, the CR is not changed during the subsequent engine restart. The engine may be restarted by cranking the engine with the selected compression ratio maintained for a given number of cycles. Following 224, method 200 ends.

If the controller-initiated engine restart is not requested, method 200 proceeds to 230 and includes maintaining the engine in the shutdown condition. For example, the engine will remain at rest, with no spark and no fuel provided. Following 230, method 200 ends.

If the engine shutdown request is operator-initiated (as determined at 208) or if the engine shutdown request is controller-initiated and the compression ratio is greater than the threshold (as determined at 214), method 200 proceeds to 218 and includes actuating the VCR mechanism to provide the lowest compression ratio, even if the engine operating conditions otherwise would have warranted the higher compression ratio, before shutting off fuel and spark to the engine. For example, if the VCR mechanism includes two settings, one corresponding to a high compression ratio and one corresponding to a low compression ratio, the low compression ratio setting may be selected. In another example, if the VCR mechanism includes multiple compression ratio settings between a highest compression ratio and a lowest compression ratio, the lowest compression ratio setting may be selected. As part of a controlled shut down, the controller may actuate the VCR mechanism to the lowest compression ratio setting by mechanically altering a position of the piston within the cylinder after a last combustion event of the cylinder and before shutting off fuel and spark to the engine. In this way, oil pressure, which may be used to adjust the position of the VCR mechanism, remains high during the compression ratio transition. With fuel and spark disabled, the engine may continue to pump air after transitioning to the lowest compression ratio until it stops spinning. Herein, the last combustion event is completed at the lowest compression ratio, and thereafter, the engine spins to rest, unfueled, at the lowest compression ratio. In an alternative example, if there is not time (or sufficient battery SOC) to move the VCR mechanism to the lowest compression ratio setting, then it may be moved to a position corresponding to a compression ratio that is lower than the threshold compression ratio, as defined at 214. With the reduced compression ratio, engine shake and piston bounce-back may be reduced during shutdown. By actuating the VCR mechanism to the lowest compression ratio setting responsive to an operator-initiated engine shutdown request, independent of the compression ratio of the engine at the time of the shutdown request, the engine may be configured to start at the lowest compression ratio. Thus, the lowest compression ratio may be considered to be a base or default value. However, given sufficient battery SOC, if the VCR mechanism is actuated by an electric actuator, the VCR mechanism may be adjusted while the vehicle is at rest to provide a higher compression ratio if desired, as described further below.

At 226, it is determined if an engine restart is requested. The engine restart request may be a controller-initiated engine restart request (e.g., as defined at 222) or an operator-initiated engine restart request. For example, an operator-initiated engine restart request may follow an operator-initiated engine shutdown request (e.g., as defined at 208), whereas a controller-initiated engine restart request may follow a controller initiated shutdown request (e.g., as defined at 210) when the compression ratio is greater than the threshold. In one example, the operator-initiated restart request may be confirmed in response to the vehicle ignition being moved from a key-off to a key-on position. In another example, the vehicle operator may depress a push-button to request the engine restart.

If an engine restart, whether from the vehicle operator or the controller, is not requested at 226, method 200 proceeds to 230 and includes maintaining the engine in the shutdown condition, as described above. If an engine restart is requested, method 200 proceeds to 228 and includes restarting the engine while maintaining the lowest compression ratio. For example, the VCR mechanism position may not be adjusted prior to cranking and may be maintained during cranking the engine for a given number of cycles. In other examples, if the battery SOC is greater than the threshold and the VCR mechanism is an electrically actuated mechanism, the compression ratio may be adjusted prior to cranking based on engine operating conditions. For example, if a cold-start condition is present (e.g., the engine temperature is less than a first, lower threshold engine temperature and/or the ambient temperature is less than a first, lower threshold ambient temperature), the VCR mechanism may be actuated to a high compression ratio position to aid in fuel evaporation and starting. In another example, if a hot-start condition is present (e.g., the engine temperature is greater than a second, higher threshold engine temperature and/or the ambient temperature is greater than a second, higher threshold ambient temperature), the VCR mechanism may be actuated to a low compression ratio to avoid knock during engine run up. Therefore, the controller may refer a look-up table with the engine temperature, the ambient temperature, the knock history of the engine, and the battery SOC as the input and output the compression ratio for engine restart, for example. Following 228, method 200 ends.

Whether the engine is restarted in the lowest compression ratio (e.g., at 228), with the selected compression ratio maintained (e.g., at 224), or after transitioning to a different compression ratio prior to cranking based on operating conditions, following the restart (e.g., after engine run up is complete), the engine may be transitioned to the compression ratio offering the highest efficiency, as described above (for example, by repeating method 200). In one example, if the engine is in a cold-start condition, the engine may be started at a high compression ratio, as described above, and then transitioned to a low compression ratio after run up for more heat rejection to the exhaust in order to aid catalyst warm up. In another example, if the engine is in a hot-start condition, the engine may be started at a low compression ratio, as described above, and then transitioned to a high compression ratio to improve fuel economy. In this way, the compression ratio may be continuously updated to maximize engine efficiency as operating conditions change.

FIG. 3 shows an example graph 300 of compression ratio adjustments during engine operation and shutdown. Engine speed is shown in plot 302, compression ratio is shown in plot 304, operator request is shown in plot 306, controller request is shown in plot 308, battery state of charge is shown in plot 308, and engine vibration is shown in plot 312. For all of the above, the X-axis represents time, with time increasing from left to right. The Y-axis of each plot represents the labeled parameter, with values increasing from bottom to top, except for plots 306 and 308, in which the operator (plot 306) and controller (plot 308) requests are indicated as "stop" and "start." Further, a first, highest engine speed threshold is indicated by dashed line 314, above which the engine is transitioned to operating at a low compression ratio; a second engine speed threshold, lower than the first, is indicated by dashed line 316, above which the engine is expected to have a higher than threshold amount of engine shake during shutdown while operating at a high compression ratio (e.g., due to a prolonged duration within a shutdown shake speed region of the engine); a third engine speed threshold, lower than the second, and a fourth engine speed threshold, lower than the third, are indicated by dashed lines 318 and 320, respectively, the third and fourth engine speed thresholds defining the shutdown shake speed region of the engine; a threshold battery SOC is indicated by dashed line 322, above which the controller may initiate an engine idle-stop and below which the controller may initiate an engine restart; and an engine vibration threshold is indicated by dashed line 324, which corresponds to the threshold amount of engine shake during shutdown. Note that while the first, highest engine speed threshold 314 is illustrated as having a constant value in FIG. 3, in other examples, the first, highest engine speed threshold may vary based on engine load, with the first, highest engine speed threshold decreasing as engine load increases.

Prior to t1, the operator request (plot 306) and the controller request (plot 308) are both in a "stop" condition, and the engine is at rest (plot 302). For example, the ignition may be in a key-off position. The engine compression ratio is set to low (plot 310), and the battery SOC is relatively high (plot 310) and above the threshold battery SOC (dashed line 322). With the engine at rest, no engine vibrations are measured by a vibration sensor (such as knock sensor 90 of FIG. 1).

At t1, an engine start request is received from the vehicle operator (plot 306), for example, in response to a key-on operation by the operator. The controller responds to the operator request by also initiating an engine start request (plot 308). The engine speed (plot 302) increases as the engine is cranked, quickly transitioning through the shutdown shake speed region of the engine defined by the fourth engine speed threshold 320 (e.g., 150 RPM) and the third engine speed threshold 318 (e.g., 350 RPM), and the battery SOC (plot 310) decreases due to the battery (e.g., traction battery 58 of FIG. 1) being used to supply power for cranking. Engine vibration (plot 312) increases as the engine is cranked, and the engine continues to vibrate as it is operated, with vibrations staying below the engine vibration threshold (dashed line 324). Further, due to the engine speed being below the first, highest threshold engine speed (dashed line 314) between t1 and t2, shortly after engine start, the engine is transitioned to the high compression ratio (plot 304), such as by actuating a VCR mechanism (e.g., VCR mechanism 194 of FIG. 1) to a position corresponding to the high compression ratio, in order to increase fuel economy. As the engine is operated, the battery is charged, and so the battery SOC (plot 310) begins to increase.

The engine speed (plot 302) increases responsive to operator demand, and at t2, the engine speed surpasses the first, highest threshold engine speed (dashed line 314). Therefore, the engine is transitioned to the low compression ratio (plot 304), such as by actuating the VCR mechanism to a position corresponding to the low compression ratio, in order to improve combustion phasing efficiency. For example, if the engine were to remain at the high compression ratio with the engine speed greater than the first, higher threshold engine speed, spark retard due to early knock onset may erode the fuel economy benefit.

At t3, a controller-initiated engine stop is requested (plot 308), for example, in response to an operator pedal tip-out, without receiving an engine stop request from the vehicle operator (plot 306). Further, the battery SOC (plot 310) is above the threshold SOC (dashed line 322). Because the engine is already operating at the low (e.g., lowest) compression ratio, the engine is shut down while maintaining the VCR mechanism in the low compression ratio position. The engine vibrates (plot 312) as it spins down to rest, particularly while it passes through the shutdown shake speed region of the engine defined by third engine speed threshold 318 and fourth engine speed threshold 320, but because the engine is operating in the low compression ratio (plot 304), the vibrations remain below the engine vibration threshold (dashed line 324). While the engine is off, the battery SOC decreases (plot 310), for example, due to vehicle lights and auxiliary devices drawing power. With the battery SOC above the threshold battery SOC, while the engine is at rest between t3 and t4, the VCR mechanism could be prepositioned to the high compression ratio prior to engine restart if the engine were in a cold-start condition, for example. However, in the example of FIG. 3, the engine is not in a cold-start condition, with ambient air temperature above a first, lower threshold temperature (not shown), and so the VCR mechanism position is maintained.

At t4, a controller-initiated engine start is requested (plot 308), for example, in response to an operator pedal tip-in. The engine remains in the low compression ratio (plot 304) during engine restart. The battery SOC (plot 310) experiences a sharp decrease, and the engine vibration (plot 312) increases as the engine is cranked. Following engine start, the engine is transitioned to the high compression ratio due to the engine speed (plot 302) being below the first, highest threshold engine speed (dashed line 314).

At t5, a second controller-initiated engine stop is requested (plot 308), for example, in response to another operator pedal tip-out, without receiving an engine stop request from the vehicle operator (plot 306). The battery SOC (plot 310) remains above the threshold SOC (dashed line 322), allowing for the engine stop to occur. Unlike at t3, at t5, the engine is operating at the high compression ratio (plot 304). However, the high compression ratio may be considered to be less than a threshold compression ratio for the given engine speed, as described with respect to FIG. 2, since the engine speed (plot 302) is less than the second threshold engine speed (dashed line 316). Therefore, at t5, the engine remains at the high compression ratio (plot 304) as the engine is shut down. As the engine spins to rest (plot 302), engine vibrations occur (plot 312) with higher magnitudes than the vibrations during the first engine shutdown at the low compression ratio (e.g., between t3 and t4), but remain below the engine vibration threshold (dashed line 324).

Once the engine is at rest between t5 and t6, because the battery SOC above the threshold battery SOC, the VCR mechanism could be prepositioned to the low compression ratio prior to engine restart if the engine were in a hot-start condition, for example. However, in the example of FIG. 3, the engine is not in a hot-start condition, with ambient air temperature below a second, higher threshold temperature (not shown), and so the VCR mechanism position is maintained.

At t6, a second controller-initiated engine start is requested (plot 308), for example, in response to another operator pedal tip-in. The engine remains in the high compression ratio (plot 304) during the engine restart. The battery SOC (plot 310) decreases and the engine vibration (plot 312) increases as the engine is cranked. Between t6 and t7, the engine remains in the high compression ratio due to the engine speed (plot 302) being below the first, highest threshold engine speed (dashed line 314).

At t7, a third controller-initiated engine stop is requested (plot 308), for example, in response to the operator applying a brake pedal, without receiving an engine stop request from the vehicle operator (plot 306). The battery SOC (plot 310) remains above the threshold SOC (dashed line 322), allowing for the engine stop to occur. At t7, the engine speed (plot 302) is greater than the second threshold engine speed (dashed line 316), and so the engine is transitioned to the low compression ratio (plot 304) as it is shut down (e.g., following completion of an expansion stroke of a last combustion event). For example, with the engine speed prior to shutdown above the second threshold engine speed, a duration d2 spent in the shutdown shake speed region is greater than a duration d1 spent in the shutdown shake speed region of the engine when the engine speed prior to shutdown is below the second threshold engine speed. Therefore, as the engine spins to rest (plot 302), engine vibrations (plot 312) remain below the engine vibration threshold (dashed line 324). However, if instead the engine were maintained at the high compression ratio during shutdown, engine vibrations higher than the engine vibration threshold may occur, as indicated by dashed segment 313. Thus, by transitioning to the low compression ratio before the engine finishes spinning down to rest, higher than threshold engine vibrations are prevented.

At t8, the battery SOC (plot 310) drops below the threshold SOC (dashed line 322). Thus, a third controller-initiated engine start is requested (plot 308) to ensure that the battery has enough charge for cranking. The engine is maintained at the low compression ratio during the engine restart. However, after the engine is started, since the engine speed (plot 302) is less than the first, higher threshold engine speed (dashed line 314), the engine is transitioned to the high compression ratio (plot 304) in order to maximize engine efficiency.

At t9, an engine stop request is received from the vehicle operator (plot 306), for example, in response to a key-off operation. Responsive to the operator-initiated engine stop request, the controller also initiates an engine stop request (plot 308). Although the engine speed (plot 302) is below the second, lower threshold engine speed (dashed line 316), which would enable the engine to remain at the high compression ratio during controller-initiated shutdown, since the shutdown request is operator-initiated, the engine is transitioned to the low compression ratio (plot 304). In some examples, the engine may remain shut down for a longer duration when it is an operator-initiated event versus a controller-initiated event; thus, the low compression ratio may be thought of as a base compression ratio setting for engine start. As the engine is shut down, engine vibrations (plot 312) occur, but remain below the engine vibration threshold (dashed line 324) and are lower in magnitude than those produced when the engine is shut down at the high compression ratio (e.g., between t5 and t6.

In this way, NVH issues caused by piston bounce-back during engine shutdown are reduced by lowering the compression ratio, minimizing vehicle operator disturbances and thereby increasing operator satisfaction. Further, reducing vibrations during shutdown may reduce engine wear and help extend the life of engine system components. However, when the compression ratio is less than a threshold compression ratio, which may be determined based on the engine speed, and the engine shutdown is controller-initiated, the compression ratio may be maintained in order to enable the engine to be restarted in the lower compression ratio, which may improve engine efficiency. The technical effect of reducing a compression ratio of a variable compression ratio engine during engine shutdown is that shutdown shake may be reduced.

As an example, a method is provided, comprising: operating an engine at a compression ratio via mechanical adjustments to a variable compression ratio mechanism, the compression ratio selected based on operating conditions; and during an engine shutdown, lowering the compression ratio after a last combustion event and before disabling fuel and spark. In the preceding example, additionally or optionally, the lowering is responsive to predicted or detected engine shake during the engine shutdown as the engine passes through a defined speed range, the engine shake predicted based on an expected duration of the engine in the defined speed range, the defined speed range below an idling speed of the engine, the predicted engine shake increased as the expected duration increases. In any or all of the preceding examples, additionally or optionally, the lowering includes lowering on a cylinder-by-cylinder basis based on a cylinder knock history, the compression ratio of a first engine cylinder having a higher knock count lowered further than the compression ratio of a second engine cylinder having a lower knock count. In any or all of the preceding examples, additionally or optionally, lowering the compression ratio includes lowering the compression ratio mechanically using engine torque or using motor torque from an electric motor coupled to the variable compression ratio mechanism. In any or all of the preceding examples, additionally or optionally, the lowering is further based on a state of charge of a battery powering the electric motor, the compression ratio lowered further when the state of charge is higher than when the state of charge is lower. In any or all of the preceding examples, the method additionally or optionally further comprises, during an engine restart following the engine shutdown, adjusting the compression ratio based on engine temperature at the engine restart. In any or all of the preceding examples, additionally or optionally, the adjusting includes: during an engine cold-start, cranking the engine in a higher compression ratio and then lowering the compression ratio; and during an engine hot-start, cranking the engine in the lower compression ratio and then raising the compression ratio. In any or all of the preceding examples, additionally or optionally, lowering the compression ratio includes lowering the compression ratio to a lowest possible compression ratio achievable via the variable compression ratio mechanism if a duration to the defined speed range on the engine shutdown is less than a threshold, and lowering the compression ratio a lower than current compression ratio if the duration to the defined speed range on the engine shutdown is more than the threshold.

As another example, a method is provided, comprising: during a first engine shutdown, before disabling fuel to an engine, transitioning the engine to a lower compression ratio, and spinning down the engine to rest in the lower compression ratio; and during a second engine shutdown, spinning down the engine to rest, unfueled, while maintaining a current compression ratio. In the preceding example, the method additionally or optionally further comprises, during each of the first and second engine shut-down, predicting engine shutdown vibration based on past shutdown vibration history, the current compression ratio, and an engine speed when the first or second engine shutdown is commanded, and wherein during the first engine shutdown, the predicted engine vibration is higher than a threshold, and during the second engine shutdown, the predicted engine vibration is lower than the threshold. In any or all of the preceding examples, additionally or optionally, transitioning to the lower compression ratio includes transitioning from the current compression ratio to a lowest possible compression ratio of the engine attainable via mechanical actuation of a variable compression ratio (VCR) mechanism, and wherein during the first engine shutdown, the current compression ratio is higher than a threshold compression ratio and during the second engine shutdown, the current compression ratio is lower than the threshold compression ratio. In any or all of the preceding examples, additionally or optionally, during the first engine shutdown, a predicted duration spent by the engine in a shutdown shake speed region is higher and wherein during the second engine shutdown, the predicted duration spent by the engine in the shutdown shake speed region is lower. In any or all of the preceding examples, the method additionally or optionally further comprises predicting engine vibration based on past engine shutdown shake history and the predicted duration spent by the engine in the shutdown shake region of the engine during the engine spin-down to rest, the shutdown shake region encountered below an idling speed region of the engine, and detecting engine vibration via a pressure sensor coupled to an engine block. In any or all of the preceding examples, additionally or optionally, the first engine shutdown is commanded responsive to operator input, and wherein the second engine shutdown is commanded automatically, without receiving operator input. In any or all of the preceding examples, the method additionally or optionally further comprises, during a first engine restart following the first engine shutdown, cranking the engine in the lower compression ratio and then transitioning to a compression ratio selected based on engine operating conditions, and during a second engine restart following the first engine restart, cranking the engine in the current compression ratio.

As another example, an engine system is provided, comprising: an engine; a variable compression ratio mechanism for mechanically altering a piston displacement within a cylinder; a vibration sensor coupled to the engine; a pedal for receiving an operator input; and a controller with computer readable instructions for: actuating the variable compression ratio mechanism to a first position corresponding to a higher compression ratio responsive to a lower than threshold engine load; and responsive to an operator requested engine shutdown, disabling fuel delivery to the engine; and after completing a last combustion event while in the higher compression ratio, actuating the variable compression ratio mechanism to a second position corresponding to a lower compression ratio. In the preceding example, additionally or optionally, the engine is spun to rest while in the lower compression ratio and maintained in the lower compression ratio until a subsequent engine restart command is received, and the controller includes further instructions for: responsive to an engine restart command, cranking the engine with the variable compression ratio mechanism in the second position, and after engine speed is above a threshold speed, actuating the variable compression ratio mechanism to the first position corresponding to the higher compression ratio. In any or all of the preceding examples, the controller additionally or optionally includes further instructions for: responsive to an automatic engine shutdown without operator input, disabling fuel delivery to the engine, maintaining the variable compression ratio mechanism in the first position, and spinning the engine to rest while in the higher compression ratio. In any or all of the preceding examples, the controller additionally or optionally includes further instructions for: responsive to an output of the vibration sensor being higher than a threshold while spinning the engine to rest while in the higher compression ratio, actuating the variable compression ratio mechanism to the second position corresponding to the lower compression ratio. In any or all of the preceding examples, additionally or optionally, the actuating the variable compression ratio mechanism to the second position corresponding to the lower compression ratio is responsive to an engine speed when the operator requested shutdown is received being higher than a threshold speed, and wherein the controller includes further instructions for: responsive to an engine speed when the operator requested shutdown is received being lower than the threshold speed, transitioning from the higher compression ratio to the lower compression ratio after completing the last combustion event, then disabling fuel delivery to the engine and spinning the engine to rest in the lower compression ratio.

In another representation, the vehicle system described above is a hybrid vehicle system, further comprising an electric machine; a transmission; one or more vehicle wheels coupled to the transmission; a first clutch coupled between the engine and the transmission; and a second clutch coupled between the electric machine and the transmission. In the preceding example, additionally or optionally, engaging the first clutch couples the engine to the one or more vehicle wheels via the transmission. In any or all of the preceding examples, additionally or optionally, engaging the second clutch couples the electric machine to the one or more vehicle wheels via the transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   operating an engine at a compression ratio via mechanical adjustments to a variable compression ratio mechanism, the compression ratio selected based on operating conditions; and
   during an engine shutdown, lowering the compression ratio after a last combustion event and before disabling fuel and spark, wherein the lowering is responsive to predicted or detected engine shake during the engine shutdown as the engine passes through a defined speed range, the engine shake predicted based on an expected duration of the engine in the defined speed range, the defined speed range below an idling speed of the engine, the predicted engine shake increased as the expected duration increases.

2. The method of claim 1, wherein the lowering includes lowering on a cylinder-by-cylinder basis based on a cylinder knock history, the compression ratio of a first engine cylinder having a higher knock count lowered further than the compression ratio of a second engine cylinder having a lower knock count.

3. The method of claim 1, wherein lowering the compression ratio includes lowering the compression ratio mechanically using engine torque or using motor torque from an electric motor coupled to the variable compression ratio mechanism.

4. The method of claim 3, wherein the lowering is further based on a state of charge of a battery powering the electric motor, the compression ratio lowered further when the state of charge is higher than when the state of charge is lower.

5. The method of claim 1, further comprising, during an engine restart following the engine shutdown, adjusting the compression ratio based on engine temperature at the engine restart.

6. The method of claim 5, wherein the adjusting includes:
during an engine cold-start, cranking the engine in a higher compression ratio and then lowering the compression ratio; and
during an engine hot-start, cranking the engine in a lower compression ratio and then raising the compression ratio.

7. The method of claim 1, wherein lowering the compression ratio includes lowering the compression ratio to a lowest possible compression ratio achievable via the variable compression ratio mechanism if a duration to the defined speed range on the engine shutdown is less than a threshold, and lowering the compression ratio to a lower than current compression ratio if the duration to the defined speed range on the engine shutdown is more than the threshold.

8. A method, comprising:
during a first engine shutdown, before disabling fuel to an engine, transitioning the engine to a lower compression ratio, and spinning down the engine to rest in the lower compression ratio;
during a second engine shutdown, spinning down the engine to rest, unfueled, while maintaining a current compression ratio; and
during a first engine restart following the first engine shutdown, cranking the engine in the lower compression ratio and then transitioning to a compression ratio selected based on engine operating conditions, and during a second engine restart following the first engine restart, cranking the engine in the current compression ratio.

9. The method of claim 8, further comprising, during each of the first and second engine shutdown, predicting engine shutdown vibration based on past shutdown vibration history, the current compression ratio, and an engine speed when the first or second engine shutdown is commanded, and wherein during the first engine shutdown, the predicted engine shutdown vibration is higher than a threshold, and during the second engine shutdown, the predicted engine shutdown vibration is lower than the threshold.

10. The method of claim 8, wherein transitioning to the lower compression ratio includes transitioning from the current compression ratio to a lowest possible compression ratio of the engine attainable via mechanical actuation of a variable compression ratio (VCR) mechanism, and wherein during the first engine shutdown, the current compression ratio is higher than a threshold compression ratio and during the second engine shutdown, the current compression ratio is lower than the threshold compression ratio.

11. The method of claim 8, wherein during the first engine shutdown, a predicted duration spent by the engine in a shutdown shake speed region is higher and wherein during the second engine shutdown, the predicted duration spent by the engine in the shutdown shake speed region is lower.

12. The method of claim 11, further comprising predicting engine vibration based on past engine shutdown shake history and the predicted duration spent by the engine in the shutdown shake region of the engine during an engine spin-down to rest, the shutdown shake region encountered below an idling speed region of the engine, and detecting engine vibration via a pressure sensor coupled to an engine block.

13. The method of claim 8, wherein the first engine shutdown is commanded responsive to operator input, and wherein the second engine shutdown is commanded automatically, without receiving operator input.

14. An engine system, comprising:
an engine;
a variable compression ratio mechanism for mechanically altering a piston displacement within a cylinder;
a vibration sensor coupled to the engine;
a pedal for receiving an operator input; and
a controller with computer readable instructions to:
actuate the variable compression ratio mechanism to a first position corresponding to a higher compression ratio responsive to a lower than threshold engine load; and
responsive to an operator requested engine shutdown, disabling fuel delivery to the engine; and
after completing a last combustion event while in the higher compression ratio, actuating the variable compression ratio mechanism to a second position corresponding to a lower compression ratio; and
responsive to an output of the vibration sensor being higher than a threshold while spinning the engine to rest while in the higher compression ratio,
actuating the variable compression ratio mechanism to the second position corresponding to the lower compression ratio.

15. The system of claim 14, wherein the engine is spun to rest while in the lower compression ratio and maintained in the lower compression ratio until a subsequent engine restart command is received, and wherein the controller includes further instructions to:
responsive to an engine restart command, cranking the engine with the variable compression ratio mechanism in the second position, and after engine speed is above a threshold speed, actuating the variable compression ratio mechanism to the first position corresponding to the higher compression ratio.

16. The system of claim 14, wherein the controller includes further instructions to:
responsive to an automatic engine shutdown without operator input, disabling fuel delivery to the engine, maintaining the variable compression ratio mechanism in the first position, and spinning the engine to rest while in the higher compression ratio.

17. The system of claim 14, wherein the actuating the variable compression ratio mechanism to the second position corresponding to the lower compression ratio is responsive to an engine speed when the operator requested shutdown is received being higher than a threshold speed, and wherein the controller includes further instructions to:
responsive to the engine speed when the operator requested engine shutdown is received being lower than the threshold speed, transitioning from the higher compression ratio to the lower compression ratio after completing the last combustion event, then disabling fuel delivery to the engine and spinning the engine to rest in the lower compression ratio.

* * * * *